United States Patent [19]

Takamatsu et al.

[11] 4,409,056

[45] Oct. 11, 1983

[54] CURABLE SEALING COMPOSITION

[75] Inventors: Hideo Takamatsu; Shobu Minatono, both of Ibaragi, Japan

[73] Assignee: Kuraray Co., Ltd., Kurashiki, Japan

[21] Appl. No.: 326,052

[22] Filed: Nov. 30, 1981

Related U.S. Application Data

[63] Continuation of Ser. No. 227,746, Jan. 23, 1981, abandoned, which is a continuation of Ser. No. 70,612, Aug. 29, 1979, abandoned.

[30] Foreign Application Priority Data

Sep. 12, 1978 [JP] Japan ............................... 53-112673
Sep. 12, 1978 [JP] Japan ............................... 53-112674

[51] Int. Cl.$^3$ ............................................. C09J 3/10
[52] U.S. Cl. .................................. 156/334; 427/372.2; 427/393.5; 427/388.2; 264/236; 264/242; 264/261
[58] Field of Search ............ 525/99; 427/372.2, 385.7, 427/393.5; 156/156, 337, 334

[56] References Cited

U.S. PATENT DOCUMENTS

| | | | |
|---|---|---|---|
| 3,160,595 | 12/1964 | Hardman et al. | 525/232 |
| 3,322,738 | 5/1967 | Uraneck et al. | 525/354 |
| 3,830,880 | 8/1974 | Le Nare | 525/314 |

FOREIGN PATENT DOCUMENTS 1090207 11/1967 United Kingdom ............... 525/314

*Primary Examiner*—J. Ziegler
*Attorney, Agent, or Firm*—Oblon, Fisher, Spivak, McClelland & Maier

[57] ABSTRACT

There is provided a curable sealing composition comprising a low molecular weight rubber, a curing agent and other additives as required and being characterized in that a block copolymer of isoprene and butadiene with a viscosity average molecular weight of 7,000–150,000 is used as the low molecular weight rubber. The composition has a good workability, and when cured, produces seals having excellent thermal stability, elasticity and sealing effect.

4 Claims, No Drawings

CURABLE SEALING COMPOSITION

This is a continuation of Application Ser. No. 227,746, filed Jan. 23, 1981, which in turn is a continuation of Application Ser. No. 070,612, filed Aug. 29, 1979, both of which are now abandoned.

BACKGROUND OF THE INVENTION

Field of the Invention

This invention relates to a curable sealing composition which is excellent in processability, heat stability and elasticity and in which a low molecular weight isoprene-butadiene block copolymer is used as a rubber component.

DESCRIPTION OF THE PRIOR ART

Various sealing compositions containing synthetic rubbers and synthetic resins are now in wide use, responding to purposes and performance requirements in automobile industries. The so-called curable sealing compositions, which are used for sealing joints or junctures between the roof and the panel or between the rear quarter panel and the wheel housing, are often used in relatively earlier steps of automobile production and therefore are subjected in the later production steps to various conditions including heating. Accordingly those sealing compositions which are to be used for the purpose mentioned above are required to be stable against heat. Furthermore, these sealing compositions are placed between steel sheets, so that they are desired to be elastic, i.e. capable of absorbing strain of steel sheets and vibration thereof. Therefore, diene rubbers are being used in many cases.

Furthermore, since these sealing compositions are applied in most cases by the use of a caulking gun so as to increase workability, it is necessary that they should have sufficient flowability or sufficiently low viscosity at room temperature or under moderate heating. The use of a so-called liquid rubber is best suited to these requirements. However, the conventional liquid rubbers so far used in sealing compositions are very unstable against heat and are of no practical use. Thus, in cases where a low molecular weight polyisoprene is used in a sealing composition, as is described in U.S. Pat. No. 3,160,595, for instance, the composition, even after cure or vulcanization, is easily deteriorated due to softening and becomes sticky when it is exposed to high temperature, failing to bring about the desired sealing effect. Also in cases where a low molecular weight polybutadiene is used, the corresponding composition is easily deteriorated by thermal crosslinking, becoming brittle and losing elasticity.

SUMMARY OF THE INVENTION

The present invention aims at solution of the above problems. Accordingly, a primary object of the invention is to provide curable sealing compositions which have sufficient flowability at the time of application thereof as sealents, are excellent in workability and, when cured or vulcanized, have excellent heat stability, elasticity and sealing effects.

According to the invention, the above object is accomplished by the use as a low molecular weight rubber, in a curable sealing composition comprising a low molecular weight rubber, a vulcanizing or curing agent and other optional additives, of an isoprene-butadiene block copolymer having a viscosity average molecular weight of 7,000 to 150,000, especially preferably a block copolymer wherein the weight ratio of isoprene/butadiene in said block copolymer is 25,75 to 85/15 or a block copolymer having a structure represented by the general formula

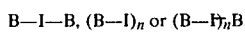

where B is a polybutadiene block, I is a polyisoprene block and n is 2 to 10.

DETAILED DESCRIPTION OF THE INVENTION

It is necessary that the block copolymer consisting of isoprene and butadiene to be used as a low molecular weight rubber according to the invention should have a viscosity average molecular weight in the range of 7,000 to 150,000, preferably in the range of 10,000 to 70,000. If the molecular weight is too high as compared with the range defined above, the resulting composition will have too high a viscosity and its flowability will be insufficient so that workability will be poor. Conversely, too low a molecular weight will make the viscosity of the composition too low, so that the composition will flow before vulcanization and hardly be secured at the place to be sealed. In this case, vulcanization efficiency will not be sufficient and good vulcanizates can hardly be obtained; mechanical strength after vulcanization is so low that sealant portions tend to break after vulcanization and fail to function as sealants. The viscosity average molecular weight (Mv) mentioned herein is calculated by the following equation:

$$[\eta] = 1.21 \times 10^{-4} M v^{0.77}$$

where $[\eta]$ is the intrinsic viscosity as measured in toluene at 30° C.

It is also necessary that the ratio of isoprene/butadiene in said block copolymer should be in the range of 25/75 to 85/15, preferably in the range of 35/65 to 75/25. If the isoprene amount exceeds the above limits, the resulting sealing composition, after vulcanization, will easily undergo aging by softening due to heat. If, conversely, the butadiene amount is too large, aging by hardening due to heat will be serious. Thus, in both the cases just mentioned, heat stability is unsatisfactory and sealant function cannot be maintained.

Furthermore, it is necessary that the block copolymer should have a structure represented by the general formula

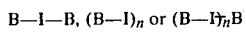

where B is polybutadiene block, I is polyisoprene block and n is 2 to 10. If n exceeds 10, the molecular weight of each block decreases and in an extreme case the polymer becomes a random copolymer. In this case, the polymer no longer has the characteristics of the block copolymer and does not show any balanced heat stability. From such a viewpoint, it is preferred that n is not greater than 4. In the case of a block copolymer having the structure B—I or I—B—I is used, its properties are substantially dependent upon those of the major component thereof. Thus, when polybutadiene is predominant, the copolymer tends to be hardened and deteriorated by heating and lose it elasticity, so that the sealant cracks and seal efficiency is no longer produced. When polyisoprene is the major component, the sealing composition is susceptible to aging by softening, which makes the composition unusable. Furthermore, when polyisoprene is used in place of the block copolymer according to the invention, the sealing composition after vulcanization has poor heat stability, softens on heating and in an extreme case flows, seal efficiency being thus lost. When polybutadiene is used, the sealing composition, on the contrary, hardens and is deteriorated on heating and loses elasticity, so that the sealant cracks and seal efficiency is lost. When a mixture of polyisoprene and polybutadiene is used, the sealing composition has similar disadvantages as found in the case of single use of the major component of the mixture, namely tendency to aging by hardening or softening depending on the composition, which makes the composition unsuited for practical use.

The isoprene-butadiene block copolymer rubber can easily be produced by living polymerization using an anionic initiator or catalyst. In this polymerization, the control of molecular weight and of weight ratio of isoprene/butadiene can be effected easily. The anionic initiator is preferably a lithium-based catalyst which preferentially gives those 1,4 structures, especially the cis-1,4 structure, that are superior in heat stability and more advantageous in respect of rubber-like elasticity. Examples of the lithium-based catalyst are metallic lithium, alkyllithiums such as propyllithium and butyllithium, cycloalkyllithiums such as cyclohexyllithium and cyclopentyllithium, aryllithiums such as phenyllithium, aralkyllithiums such as phenylmethyllithium and phenylcyclohexyllithium and other organo-monolithiums as well as organodilithiums such as napthalene-dilithium and tetraphenyldilithium. The polymerization may be carried out in the presence or absence of a solvent. Generally, the use of solvent is preferred for reasons concerned with removal of heat of polymerization and homogenization of the polymerization system. Those inert hydrocarbons that do not act as chain transfer agents are usable as solvents. Butane, pentane, hexane, cyclohexane, cyclooctane and benzene are preferred examples. The process for the polymerization using an organo-monolithium catalyst comprises, for example, adding a fixed amount of monomeric butadiene to a reactor containing the catalyst, then adding a fixed amount of monomeric isoprene after completion of polymerization of the butadiene monomer and while the polymer still has polymerization activity, allowing the polymerization to proceed until it is complete and repeating these procedures alternately until a desired block copolymer having the structure B—I—B, B—I—B—I, . . . , (B—I)$_n$B or (B—I)$_{n+1}$ is produced (See GB Nos. 884,490 and 1,090,207) or first preparing a copolymer B—I and subjecting this to coupling by means of a coupling agent such as dibromobenzene while the copolymer is still active (See GB Pat. No. 1,293,074 and 1,090,207). In cases where an organo-dilithium is used, the process may comprise first polymerizing isoprene, then adding butadiene and polymerizing the latter, to produce a copolymer B—I—B. The preferable polymerization temperature, though not specifically limited, is generally 20°–70° C., since too low a polymerization temperature makes the rate of reaction extremely small while too high a temperature may cause such an unfavorable side reaction as decomposition of the catalyst or discoloration of the resulting copolymer.

Each of the polyisoprene and polybutadiene blocks of the isoprene-butadiene block copolymer produced in this way by the use of a lithium-based catalyst has a 1,4-bond content of at least 75% and a high degree of unsaturation and therefore is suited for vulcanization with sulfur or a peroxide. The amount is from 0.5 to 10 parts by weight per 100 parts of the block copolymer.

The curable sealing composition of the present invention contains the above isoprene-butadiene block copolymer as a main component and further those compounding ingredients that are generally used in rubber vulcanization, such as filler (e.g. carbon black, calcium carbonate, clay), activator (e.g. zinc oxide, stearic acid), sulfur, vulcanization accelerator, antioxidant and sponging or blowing agent. The composition may optionally contain such a plasticizer as mineral oil, lanoline, liquid polyisoprene, liquid polybutadiene or liquid polybutene. It may also contain natural rubber or a synthetic rubber (e.g. polybutadiene rubber (BR), polyisoprene rubber (IR)) in such a small quantity that cannot bring results contrary to the object of the invention. Furthermore, it is of course possible to compound a tackfier or the like to improve adhesiveness to a steel sheet, for instance.

The composition of the invention, when, after adding a vulcanizing agent and a filler, it is applied to places to be sealed and then heated to 120°–170° C. or allowed to stand in an ambient atmosphere, displays its function as a sealant.

The curable sealing composition of the present invention is especially useful as a sealant for use in automobiles. Owing to its excellent heat stability and other characteristics, it is also useful as a sealant for civil engineering and construction and for various industrial products and also as a potting composition.

The invention is illustrated in more detail by the following examples, which are not to be construed as limiting the invention.

EXAMPLE 1 AND COMPARATIVE EXAMPLES 1–3

A block copolymer [A] having the structure B—I—B was prepared by introducing monomeric butadiene, monomeric isoprene and monomeric butadiene in this order into a hydrocarbon solvent containing sec-butyllithium as a catalyst. The viscosity average molecular weight of [A] was 52,000 and the isoprene/butadiene ratio 75/25 by weight. Separately, homopolyisoprene and homopolybutadiene were prepared by polymerizing isoprene and butadiene, respectively, using sec-butyllithium. The molecular weights of these homopolymers were 49,000 and 50,000, respectively. Using the three polymers, sealing compositions were prepared according to the formulations shown in Table 1 by kneading at 50° C. in a Brabender Plasti-Coder used as a mixer. About 5 grams of each composition was placed in the form of a semisphere on an aluminum sheet and vulcanized by heating in an oven at 150° C. for 15 minutes. The vulcanizate was further heated at 170° C. for 30 minutes and the state of the composition after vulcanization was evaluated as an index of heat aging behavior for judging heat stability of the composition.

As is clear from the data shown in Table 1, the composition of Formulation 1 which contained the B—I—B block copolymer [A] gave an excellent vulcanizate under the above vulcanization conditions and showed excellent heat stability and elasticity even after the subsequent heat treatment without showing any hardening or softening. On the contrary, the compositions of Formulations 2, 3 and 4 where homopolymers were used either showed a lower degree of hardening by vulcanization or softening followed by flowing.

TABLE 1

| | Example No. | | | |
|---|---|---|---|---|
| | 1 | Compar. 1 | Compar. 2 | Compar. 3 |
| | Formulation No. | | | |
| | 1 | 2 | 3 | 4 |
| Components | | | | |
| B-I-B [A] | 100 | — | — | — |
| Polyisoprene | — | 100 | — | 80 |
| Polybutadiene | — | — | 100 | 20 |
| Heavy calcium carbonate[1] | 400 | 400 | 400 | 400 |
| Activated zinc oxide | 10 | 10 | 10 | 10 |
| Stearic acid | 3 | 3 | 3 | 3 |
| Sulfur | 4 | 4 | 4 | 4 |
| Accelerator DM[2] | 3 | 3 | 3 | 3 |
| Accelerator DT[3] | 2 | 2 | 2 | 2 |
| Antioxidant NS-6[4] | 1 | 1 | 1 | 1 |
| State of composition after vulcanization | Good | Somewhat sticky | Hardened a little | Good |
| State of vulcanizate after heating at 170° C. for 30 minutes | No change (good) | Softened and flowed | The whole hardened | The whole softened |

Notes:
[1]Whiton SB (Shiraishi Calcium Co., Ltd.)
[2]Dibenzothiazolyl disulfide; Nocceler DM (Ouchi Shinko Chemical Industries Co., Ltd.)
[3]Di-ortho-tolylguanidine; Nocceler DT (Ouchi Shinko)
[4]2,2'-Methylenebis(4-methyl-6-tert-butylphenol); Nocrac NS-6 (Ouchi Shinko)

EXAMPLE 2 AND COMPARATIVE EXAMPLES 4-6

Block copolymers (B—I)₃, [B], [C] and [D], having an isoprene/butadiene ratio of 65/35 and different viscosity average molecular weights were prepared by adding into a hydrocarbon solvent containing sec-butyllithium as a catalyst butadiene monomer, isoprene monomer, butadiene monomer, isoprene monomer, butadiene monomer and isoprene monomer in this order. Separately, a block copolymer B—I, [E], having an isoprene/butadiene ratio of 65/35 was prepared by adding butadiene monomer and isoprene monomer in this order. The viscosity average molecular weights of these block copolymers [B], [C], [D] and [E] were 4,800, 85,000, 220,000 and 79,000, respectively. Sealing compositions were prepared using these block copolymers and according to the formulations shown in Table 2 by kneading the ingredients in a Brabender plasti-Coder at 50° C. These compositions were evaluated by the same method as in Example 1.

As can be seen from Table 2, the composition of Formulation 5 were block copolymer [B] having a low viscosity average molecular weight was used flowed and spread over the aluminum sheet during the vulcanization. As regards the composition of Formulation 7 where block copolymer [D] having a high viscosity average molecular weight was used, it was difficult to place it in the form of a semisphere due to a very high viscosity. (Filling with a caulking gun was out of question.) The composition of Formulation 8 where block copolymer [E], B—I, was used was inferior in heat stability, i.e. softened, for instance. Only the composition of Formulation 6 where block copolymer [C] which satisfied the conditions defined by the invention could easily be shaped in the form of a semisphere, showed excellent heat stability, and had excellent performance characteristics as a sealant.

TABLE 2

| | Example No. | | | |
|---|---|---|---|---|
| | Compar. 4 | 2 | Compar. 5 | Compar. 6 |
| | Formulation No. | | | |
| | 5 | 6 | 7 | 8 |
| Components | | | | |
| Block copolymer [B] | 100 | — | — | — |
| Block copolymer [C] | — | 100 | — | — |
| Block copolymer [D] | — | — | 100 | — |
| Block copolymer [E] | — | — | — | 100 |
| Precipitated calcium carbonate[1] | 500 | 500 | 500 | 500 |
| Activated zinc oxide | 10 | 10 | 10 | 10 |
| Stearic acid | 4 | 4 | 4 | 4 |
| Sulfur | 3 | 3 | 3 | 3 |
| Accelerator MAS[2] | 3 | 3 | 3 | 3 |
| Accelerator BG[3] | 1 | 1 | 1 | 1 |
| Antioxidant NS-6[4] | 1 | 1 | 1 | 1 |
| Tackifier[5] | 30 | 30 | 30 | 30 |
| State of composition after vulcanization | Flowed and spread flatly; soft | Good | Good | The surface was sticky |
| State of vulcanizate after heating at 170° C. for 30 minutes | Became sticker | No change (good) | No change (good) | The whole softened; became stickier |

Notes:
[1]Manufactured by Maruo Calcium Co., Ltd.
[2]N—Oxydiethylene-2-benzothiazolesulfenamide; Nocceler MSA (Ouchi Shinko)
[3]Ortho-tolybiguanide; Nocceler BG (Ouchi Shinko)
[4]Nocrac NS-6 (Ouchi Shinko)
[5]Hydrogenated rosin ester; Ester gum H (Arakawa Forest Chemical Industries Co., Ltd.)

EXAMPLES 3 & 4 AND COMPARATIVE EXAMPLES 7 & 8

Four kinds of block copolymers of the type B—I—B with varied isoprene/butadiene ratios were produced by adding butadiene monomer and isoprene monomer in this order into a hydrocarbon solvent containing sec-butyllithium as a catalyst, to prepare a block copolymer B—I and then adding dibromobenzene to this block copolymer while it is still active, whereby coupling of two B—I block copolymer molecules occurred to give the block copolymer B—I—B. The molecular weight and the isoprene/butadiene ratio of block copolymer [F] so prepared were 59,000 and 91/9, respectively, those of block copolymer [G] 61,000 and 65/35, respectively, those of block copolymer [H] 65,000 and 40/60, respectively and those of block copolymer [I] 58,000 and 24/86, respectively. Sealing compositions were prepared from these block copolymers according to the formulations shown in Table 3 in a mixer heated at 60° C. and then evaluated by the method of Example 1.

As is clear from the results shown in Table 3, only the compositions of Formulations 10 and 11 which satisfied the condition for the isoprene/butadiene ratio provided by the invention showed excellent heat stability.

TABLE 3

| | Example No. | | | |
|---|---|---|---|---|
| | Compar. 7 | 3 | 4 | Compar. 8 |
| | Formulation No. | | | |
| | 9 | 10 | 11 | 12 |
| Components | | | | |
| Block copolymer [F] | 100 | — | — | — |
| Block copolymer [G] | — | 100 | — | — |
| Block copolymer [H] | — | — | 100 | — |

TABLE 3-continued

| | Example No. | | | |
|---|---|---|---|---|
| | Com-par. 7 | 3 | 4 | Com-par. 8 |
| | Formulation No. | | | |
| | 9 | 10 | 11 | 12 |
| Block copolymer [I] | — | — | — | 100 |
| Heavy calcium carbonate[1] | 400 | 400 | 400 | 400 |
| Carbon black (HAF) | 50 | 50 | 50 | 50 |
| Oil[2] | 100 | 100 | 100 | 100 |
| Activated zinc oxide | 5 | 5 | 5 | 5 |
| Sulfur | 3 | 3 | 3 | 3 |
| Accelerator DM[3] | 3 | 3 | 3 | 3 |
| Accelerator DT[4] | 1 | 1 | 1 | 1 |
| Antioxidant NS-6[5] | 1 | 1 | 1 | 1 |
| Tackifier[6] | 20 | 20 | 20 | 20 |
| State of compound after vulcanization | Somewhat sticky surface | Good | Good | Good |
| State of vulcanizate after heating at 170° C. for 30 minutes | Softened and became stickier | No change (good) | No change (good) | The whole hardened |

Notes:
[1]Whiton SB (Shiraishi Calcium)
[2]Naphthene type process oil; Sunthene 450 (Sun Oil Company)
[3]Dibenzothizyl disulfide; Nocceler DM (Ouchi Shinko)
[4]Di-ortho-tolylguanidine; Nocceler DT (Ouchi Shinko)
[5]2,2'-Methylenebis(4-methyl-6-tert-butylphenol); Nocrac NS-6 (Ouchi Shinko)
[6]Terpene resin type tackifier; YS-PX-900 (Yasuhara Yushi Kogyo Co., Ltd.)

What is claimed is:

1. A method for sealing contacting surfaces comprising:
   applying to said contacting surfaces a curable sealing composition comprising a low molecular weight rubber, a curing agent and optionally, at least one other rubber compounding agent, said low molecular weight rubber being a block copolymer of isoprene and butadiene selected from the group consisting of B—I—B, $(B—I)_n$, and $(B—I)_n$—B, wherein B is a polybutadiene block, I is a polyisoprene block, and n is an integer of 2–10, with a viscosity average molecular weight of 7,000–150,000, said viscosity average molecular weight calculated by the equation:

$$[\eta] = 1.21 \times 10^{-4} M_v^{0.77}$$

where $[\eta]$ is the intrinsic viscosity as measured in toluene at 30° C.

2. The method of claim 1, wherein said other compounding agent is a filler, an activator, a vulcanization accelerator, an oxidant or a blowing agent.

3. The method of claim 1, wherein said block copolymer is prepared by polymerizing butadiene in the presence of a lithium initiator optionally in the presence of an inert hydrocarbon solvent to completion;
   adding isoprene to said polymerization medium and completely polymerizing said isoprene; and
   alternately repeating the above polymerization steps, thereby producing said block polymer.

4. The method of claim 1, wherein the 1,4-bond content of the butadiene and isoprene blocks of the copolymer is at least 75%.

* * * * *